United States Patent
Toskala et al.

(10) Patent No.: US 7,035,234 B2
(45) Date of Patent: Apr. 25, 2006

(54) OPTIMIZED SLEEP MODE OPERATION

(75) Inventors: Antti Toskala, Helsinki (FI); Mirko Aksentijevic, Espoo (FI); Otto-Aleksanteri Lehtinen, Raisio (FI)

(73) Assignee: Nokia Mobile Phones, Ltd., Espoo (FI)

( * ) Notice: Subject to any disclaimer, the term of this patent is extended or adjusted under 35 U.S.C. 154(b) by 714 days.

(21) Appl. No.: 09/759,776

(22) Filed: Jan. 12, 2001

(65) Prior Publication Data
US 2001/0008838 A1    Jul. 19, 2001

(30) Foreign Application Priority Data
Jan. 13, 2000    (FI)    ................................ 20000069

(51) Int. Cl.
*H04Q 7/00*    (2006.01)

(52) U.S. Cl. ........................ 370/329; 370/280; 370/341

(58) Field of Classification Search ................ 370/337, 370/328, 318, 252, 335, 343, 342, 347, 437, 370/329, 332, 341, 276, 277, 280, 294, 310, 370/311, 333, 336, 345, 442; 455/458, 426, 455/435.3, 332, 67.11, 67.13, 68, 114.2, 115.1, 455/115.3
See application file for complete search history.

(56) References Cited

U.S. PATENT DOCUMENTS

| | | | |
|---|---|---|---|
| 6,240,288 B1* | 5/2001 | Wan et al. ............... | 455/426.1 |
| 6,347,091 B1* | 2/2002 | Wallentin et al. ........... | 370/437 |
| 6,407,993 B1* | 6/2002 | Moulsley ..................... | 370/347 |
| 6,438,375 B1* | 8/2002 | Muller ..................... | 455/435.3 |
| 6,442,156 B1* | 8/2002 | Carlstrom ..................... | 370/343 |
| 6,477,382 B1* | 11/2002 | Mansfield et al. .......... | 455/458 |
| 6,483,815 B1* | 11/2002 | Laurent et al. ............. | 370/318 |
| 6,483,826 B1* | 11/2002 | .ANG.kerberg ............. | 370/335 |
| 6,597,679 B1* | 7/2003 | Willars ........................ | 370/342 |
| 6,707,807 B1* | 3/2004 | Menzel ........................ | 370/337 |
| 6,729,929 B1* | 5/2004 | Sayers et al. ................ | 455/446 |
| 2001/0005681 A1* | 6/2001 | Kim ........................... | 455/458 |
| 2001/0016482 A1* | 8/2001 | Bergstrom et al. .......... | 455/332 |

OTHER PUBLICATIONS

3GPP TS 25.221 V2.1.0, Oct. 1999, 3rd Generation Partnership Project; Technical Specification Group Radio Access Network; Physical Channels and Mapping of Transport Channels Onto Physical Channels (TDD) (Release 1999) pp. 1-50.

* cited by examiner

*Primary Examiner*—Phirin Sam
(74) *Attorney, Agent, or Firm*—Perman & Green, LLP

(57) ABSTRACT

The invention relates to operations in TDD (time division duplex) mode in third generation cellular telecommunication systems. According to the invention, the power level of midamble of the burst sent in the slot of the PICH channel has a predefined relation to the power level of the bursts sent at the primary CCPCH channel. This allows the mobile communication means to receive only one burst for obtaining both desired pieces of information by decoding the PICH bits to find out if a paging message is to be received, and measuring the reception level of the midamble of the PICH burst for determining the quality of the radio connection.

8 Claims, 3 Drawing Sheets

OPTIMIZED SLEEP MODE OPERATION

BACKGROUND OF THE INVENTION

1. Field of the Invention

The invention relates to operations in TDD (time division duplex) mode in third generation cellular telecommunication systems. Especially, the invention is related to such a method as specified in the preamble of the independent method claim.

2. Description of Related Art

With reference to FIG. 1, a typical third generation mobile telephone system structure will be shortly described. Only those functional blocks are shown which have certain importance to the description of the present invention; it is obvious to a person skilled in the art that a common mobile telephone system also comprises other functions and structures, which need not be discussed in greater detail here. The main parts of the mobile telephone system are: a CN or a core network 101, a UTRAN or UMTS terrestrial radio access network 102 and a UE or user equipment 103. The user equipment is often called a mobile terminal or a mobile communication means. The interface between the CN and the UTRAN is called the Iu interface, and the interface between the UTRAN and the UE is called the Uu interface.

The UTRAN is composed of RNSs or radio network subsystems 104. The interface between two RNSs is called the Iur interface. The RNS comprises a RNC or radio network controller 105 and one or more node Bs 106. The interface between an RNC and a node B is called the Iub interface. Each node B gives rise to at least one coverage area, i.e. cell, which is designated in FIG. 1 by 107.

Presently the development of third generation cellular systems is headed towards the use of a plurality of communication techniques and transmission modes over the air interface. For example, according to current plans, conventional GSM mobile phones can be used also with third generation cellular systems via GSM-capable radio access networks (UTRAN). Many other transmission modes will also be supported. The present application concerns the UTRA (UMTS Terrestrial Radio Access) TDD (time division duplex) mode.

In the UTRA TDD system all physical channels have the structure of radio frames and timeslots. The frame has a duration of 10 ms and is subdivided into 15 time slots (TS). A time slot corresponds to 2560 chips. The time slots separate different user signals in the time domain, and several bursts can be sent in the same slot separated by differing spreading codes. Each of the time slots can be allocated to either the uplink or the downlink. The allocation can be nearly symmetric or even highly asymmetric, if needed. At least one time slot has to be allocated for the downlink and at least one time slot has to be allocated for the uplink. The flexibility in the allocation of time slots in uplink and downlink directions allows the TDD mode to be adapted to highly differing environments.

The data symbols of a channel is sent in bursts. One burst is transmitted in a time slot. FIG. 2 shows the structure of a burst. A burst comprises a first data part, a midamble, a second data part and a guard period. Two types of bursts are defined in UTRA TDD, which have different lengths for the data parts and the midamble. FIG. 2 shows the lengths of a type 1 burst, data parts being 976 chips long and the midamble 512 chips long. The midamble of a type 2 burst is 256 chips long, and the data parts 1104 chips long. The guard period in both types of bursts is 96 chips long. The midamble of a burst carries no payload data. The midamble functions as a training sequence for use by a receiver in signal acquisition and tracking.

The UTRA TDD mode is described in more detail in various 3GPP (3rd Generation Partnership Project) specifications, such as the TS 25.221 V3.0.0 specification describing physical channels and mapping of transport channels onto physical channels.

In UTRA TDD the paging mechanism uses two channels, namely the PICH (Paging Indicator CHannel) and the PCH (Paging CHannel). Paging messages are carried in the PCH, and the PICH carries only indications, if paging messages relating to mobile terminals in a given paging group are to be expected. The paging channel is transmitted over a paging area (PA) which may comprise one or more cells. The number of mobile terminals within the paging area can be large, whereby the traffic volume of the paging channel can also be large. This means that if a mobile terminal were to receive paging messages only with the help of the PCH, the mobile terminal would have to listen to paging messages of PCH, which would consume an excessive amount of time for the terminal. This would cause excessive power consumption especially during sleep mode, in which the power consumption of mobile terminals should be as low as possible. The paging indicators carried in PICH indicate to each paging group of mobile terminals, if a paging message is to be expected on the PCH to some terminal of the paging group. Receiving of a paging indicator requires only receiving of a single burst and decoding the data bits of the burst to obtain the paging indicator values. The paging indicators are sent at predetermined intervals, so that terminals can stay in sleep mode between the paging indicator bursts. If a paging indicator indicates that a paging message is to be expected for the paging group of a particular mobile terminal, that mobile terminal begins to listen to PCH for a certain period to find out, if any paging messages are intended to that mobile terminal. Terminals in a paging area are divided into 60 paging groups, which allows the number of mobile terminals to stay rather low. The low number of terminals in a paging group results in a low number of paging messages intended for terminals in the group, whereby the terminals need to listen to PCH only for short periods of time. This results in a low power consumption in the sleep mode.

However, a mobile terminal also needs to monitor the quality of the radio link to the current cell of the mobile terminal. If the quality of the radio link degrades for example due to moving of the terminal out of the coverage area of the cell, the mobile terminal needs to perform a handover to another cell. For this purpose, a mobile terminal needs to receive a burst in the PCCPCH (Primary Common Control Physical Channel) and measure the reception level of the midamble of a burst carrying PCCPCH information. If the reception level is too low, the terminal needs to start searching and listening to neighboring cells to find a cell, whose transmissions the terminal can receive at a sufficient level.

Although the use of PICH already optimizes the sleep mode operations rather well, reception of PICH bursts and monitoring the strength of the PCCPCH channel still requires a terminal to leave the sleep state quite often. The prior art does not teach any way to further reduce the necessity to receive and consequently the power consumption of the mobile terminal.

SUMMARY OF THE INVENTION

An object of the invention is to realize a method, which allows better optimization of sleep mode operation for TDD terminals. A further object of the invention is to realize a method, which allows a further reduction in the time required for reception of paging indicators and for measuring radio link quality. A still further object of the invention is to realize a TDD mode mobile terminal with a better optimized sleep mode operation than mobile terminals according to prior art. A further object of the invention is to provide a system in a radio access network, which allows the TDD mode mobile terminals under control of the radio access network to further reduce the time required for reception of paging indicators and for measuring radio link quality.

The objects are reached by adjusting the transmission level of the midamble of a PICH burst to a level, which has a predefined relation to the transmission level of a PCCPCH burst. This allows a TDD mode terminal to receive a single PICH burst, and determine the paging indicators and the reception level of the PCCPCH channel.

The method according to the invention is characterized by that, which is specified in the characterizing part of the independent method claim. The mobile terminal according to the invention is characterized by that, which is specified in the characterizing part of the independent claim directed to a mobile terminal. The system according to the invention is characterized by that, which is specified in the characterizing part of the independent claim directed to a system. The dependent claims describe further advantageous embodiments of the invention.

According to the invention, the power level of midamble of the burst sent in the slot of the PICH channel has a predefined relation to the power level of the bursts sent at the primary CCPCH channel. This allows the mobile communication means to receive only one burst for obtaining both desired pieces of information by decoding the PICH bits to find out if a paging message is to be received, and measuring the reception level of the midamble of the PICH burst for determining the quality of the radio connection.

BRIEF DESCRIPTION OF THE DRAWINGS

Various embodiments of the invention will be described in detail below, by way of example only, with reference to the accompanying drawings, of which

A description of FIGS. 1 and 2 was given earlier in connection with the description of the state of the art. Same reference numerals are used for similar entities in the figures.

DETAILED DESCRIPTION OF THE PREFERRED EMBODIMENTS

According to a first aspect of the invention, a method for transmitting paging indicators in a cellular telecommunication system employing time division duplex mode is provided. In the method, information is carried in bursts over the air interface, and paging indicators are carried in data part of certain bursts having at least a data part and a training sequence part. In an advantageous embodiment of the invention the transmission level of at least the training sequence part of a burst carrying paging indicators has a predefined relation to the transmission level of the training sequence part of a burst belonging to a channel which is used in measurements of radio link quality. In a further advantageous embodiment said channel is the primary common control physical channel (PCCPCH).

In an advantageous embodiment of the invention, said predefined relation is that the transmission level of at least the training sequence part of a burst carrying paging indicators is essentially the same as the transmission level of the training sequence part of a burst belonging to said channel. In other embodiments of the invention the transmission levels can also be different, i.e. the relation may be for example such that the transmission level of the training sequence i.e. the midamble of the PICH burst has a certain predetermined offset to the transmission level of the PCCPCH burst.

In an advantageous embodiment of the invention, the midamble of the PICH slot has a predefined power offset compared to the midamble of PCCPCH. The PICH slot can be sent with a lower level than the PCCPCH although the PICH needs to be heard in the whole cell, since in some cases the PICH symbols may be repeated, which increases the probability of correct reception.

Figure 1:
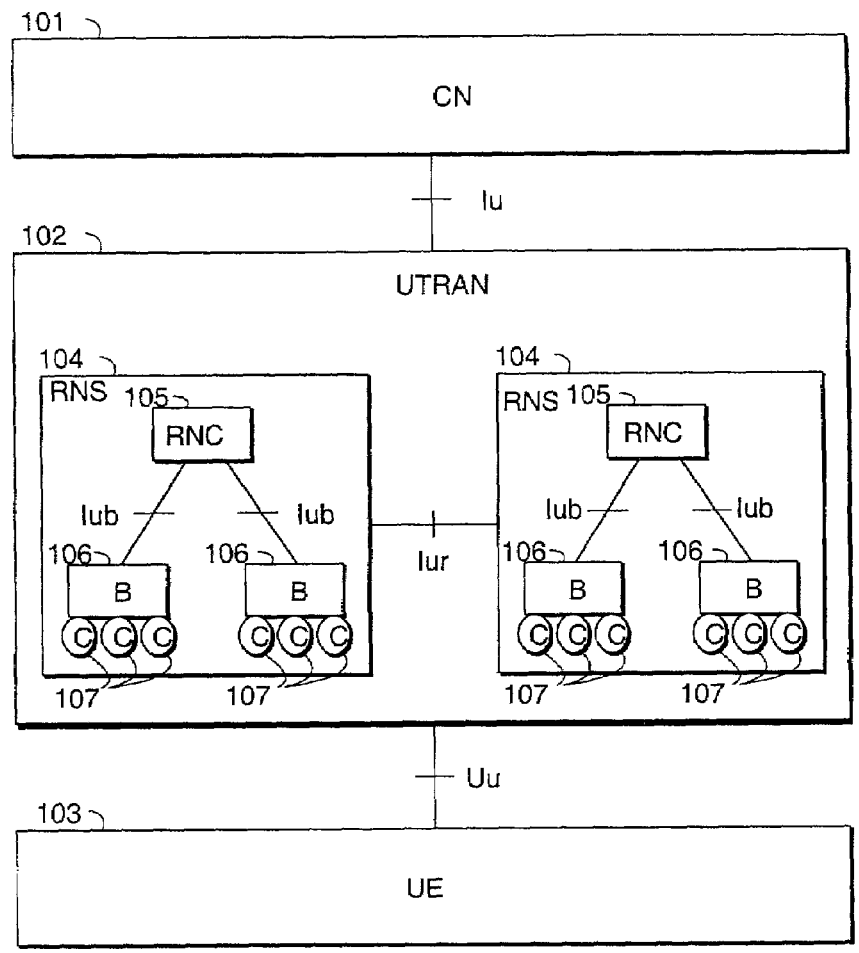
FIG. 1 illustrates an UMTS system according to prior art.
Figure 2:
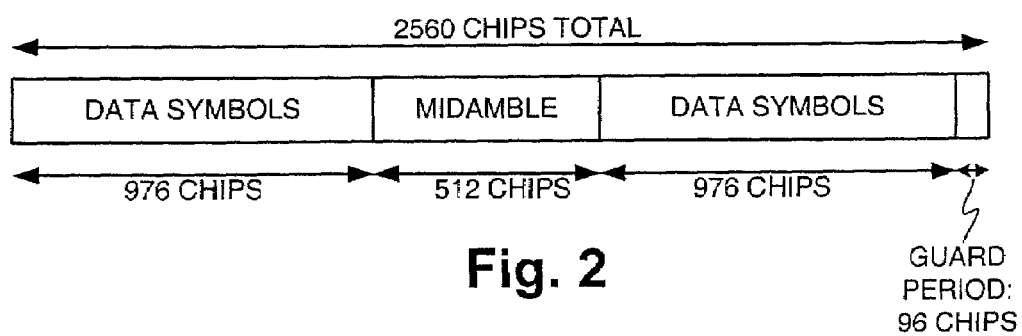
FIG. 2 illustrates burst structure in UTRA TDD mode according to prior art.
Figure 3:
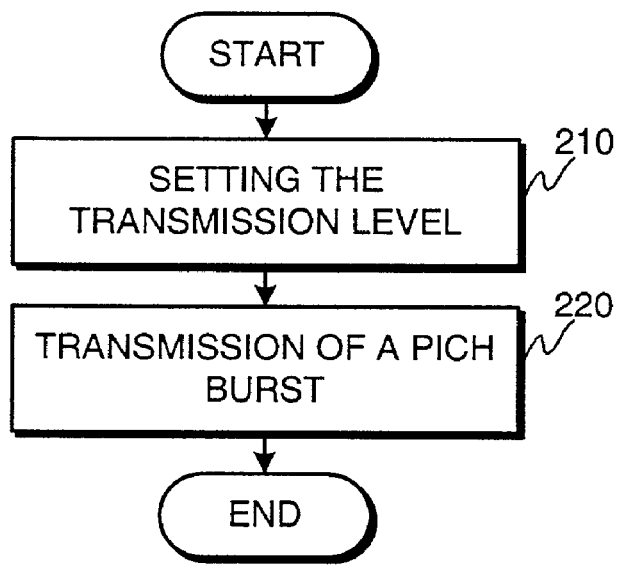
FIG. 3 illustrates a method according to an advantageous embodiment of the invention.

FIG. 3 illustrates a method for transmitting paging indicators in a cellular telecommunication system employing time division duplex mode according to an advantageous embodiment of the invention. In step 210, the transmission level of a PICH burst is set to a level having a predefined relation to the transmission level of the training sequence part of a burst belonging to a channel which is used in measurements of radio link quality. In step 220, the PICH burst is transmitted at such a level.

In an advantageous embodiment of the invention, the determination of the transmission level of the midamble of PICH bursts is performed during network planning phase, when the transmission levels for base stations are determined. The transmission level of the PICH bursts can in such an embodiment be determined to be essentially the same as the transmission level of PCCPCH bursts.

Figure 4:
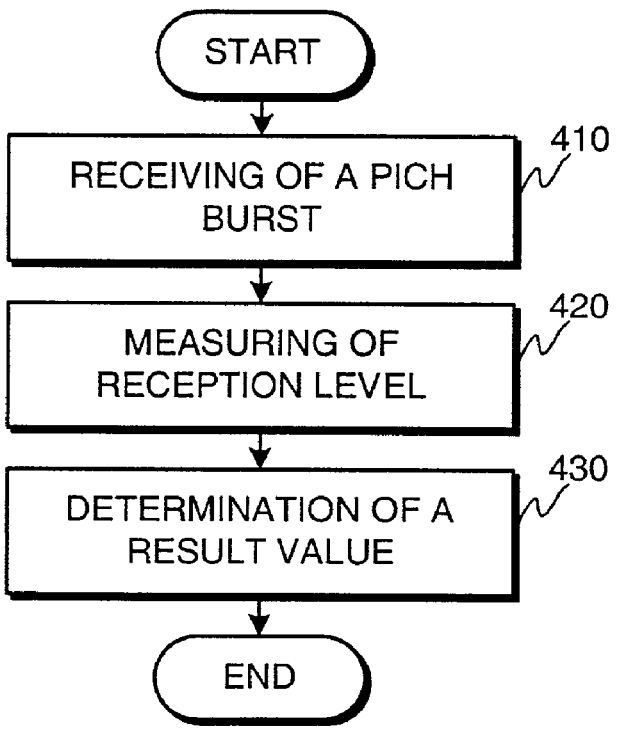
FIG. 4 illustrates a method according to a further advantageous embodiment of the invention.

According to a second aspect of the invention, a method in a mobile terminal of a cellular telecommunication network is provided for measuring quality of a radio link between the mobile terminal and a base station of the network. FIG. 4 shows an example of such a method according to an advantageous embodiment of the invention. The method is applicable with mobile terminals arranged to employ time division duplex mode and to receive bursts carrying information from the base station, the bursts having at least a data part and a training sequence part, and which mobile terminals are arranged to receive paging indicators carried in certain bursts. In an advantageous embodiment of the invention the method comprises steps, in which a burst carrying paging indicators is received 410, the reception level of the training sequence part of said burst is measured 420, and a result value indicating the quality of the radio link is determined 430 on the basis of said measurement of the reception level of the training sequence part of said burst.

According to a third aspect of the invention, a mobile terminal of a cellular telecommunication network is provided. The mobile terminal is arranged to employ time division duplex mode and to receive bursts carrying information from the base station, the bursts having at least a data part and a training sequence part. The mobile terminal is also arranged to receive paging indicators carried in certain bursts. According to an advantageous embodiment of the invention, the mobile terminal comprises means for receiving a paging indicator burst,
means for measuring the reception level of the training sequence part of said paging indicator burst, and
means for determining a result value indicating the quality of the radio link on the basis of the output of said means for measuring.

Figure 5:
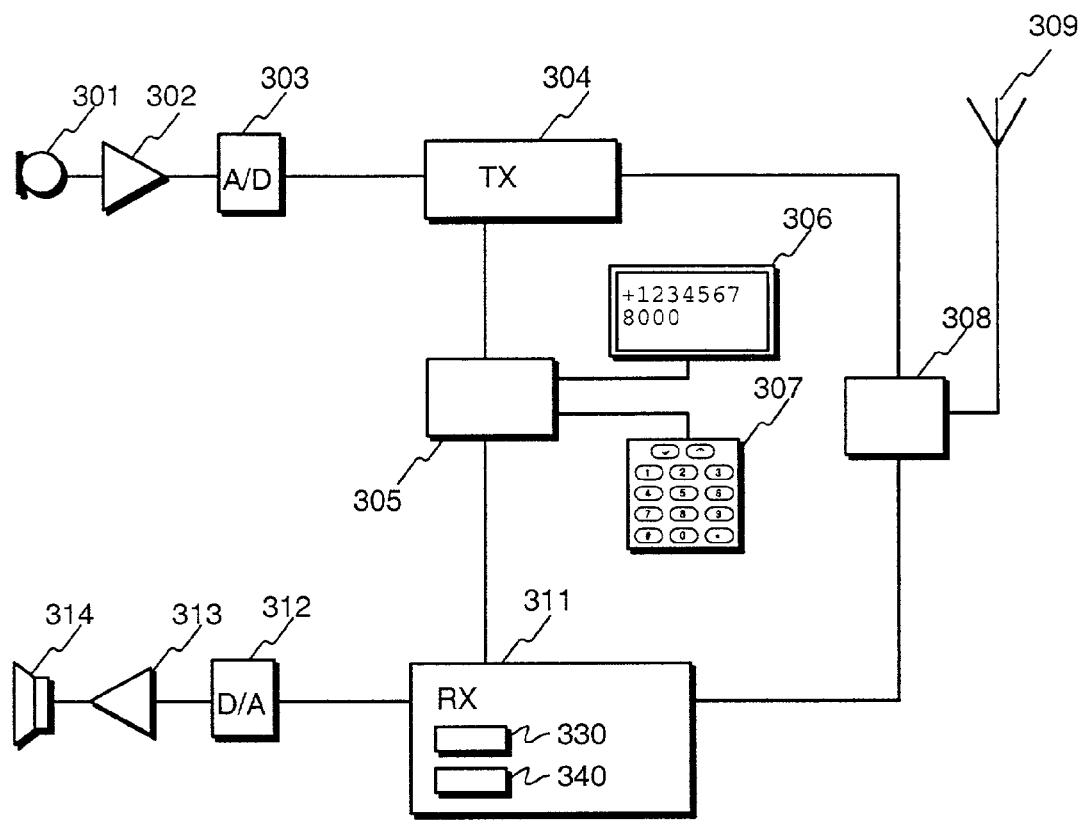
FIG. 5 illustrates a mobile terminal according to an advantageous embodiment of the invention.

FIG. 5 shows a block diagram of a mobile terminal, in this example a digital mobile communication means according to an advantageous embodiment of the invention. The mobile communication means comprises a microphone 301, keyboard 307, display 306, earpiece 314, antenna duplexer or switch 308, antenna 309 and a control unit 305, which all are typical components of conventional mobile communication means. Further, the mobile communication means contains typical transmission and receiver blocks 304, 311. Transmission block 304 comprises functionality necessary for speech coding, encryption, and modulation, and the necessary RF circuitry for amplification of the signal for transmission. Receiver block 311 comprises the necessary amplifier circuits and functionality necessary for demodulating and decryption of the signal, and removing speech coding. The signal produced by the microphone 301 is amplified in the amplifier stage 302 and converted to digital form in the A/D converter 303, whereafter the the signal is taken to the transmitter block 304. The transmitter block encodes the digital signal and produces the modulated and amplified RF-signal, whereafter the RF signal is taken to the antenna 309 via the duplexer or switch 308. The receiver block 311 demodulates the received signal and removes the encryption and channel coding. The resulting speech signal is converted to analog form in the D/A converter 312, the output signal of which is amplified in the amplifier stage 313, whereafter the amplified signal is taken to the earpiece 314. The control unit 305 controls the functions of the mobile communication means, reads the commands given by the user via the keypad 307 and displays messages to the user via the display 307. In this exemplary embodiment of the invention, the mobile communication means comprises means 308, 309, 311 for receiving a paging indicator burst, means 330 for measuring the reception level of the training sequence part of said paging indicator burst, and means 340 for determining a result value indicating the quality of the radio link on the basis of the output of said means for measuring.

According to a fourth aspect of the invention, a system in a radio access network of a cellular telecommunication system is provided. The system is applicable in cellular telecommunication systems employing time division duplex mode, in which mode information is carried in bursts over the air interface, and in which mode paging indicators are carried in data part of certain bursts having at least a data part and a training sequence part. According to an advantageous embodiment of the invention, the system comprises means 510 for adjusting the transmission level of at least the training sequence part of a burst carrying paging indicators to a certain level, said certain level having a predefined relation to the transmission level of the training sequence part of a burst belonging to a channel which is used in measurements of radio link quality. According to a further advantageous embodiment, said channel is the primary common control physical channel. According to an even further advantageous embodiment of the invention, said predefined relation is that the transmission level of at least the training sequence part of a burst carrying paging indicators is essentially the same as the transmission level of the training sequence part of a burst belonging to said channel.

Figure 6:
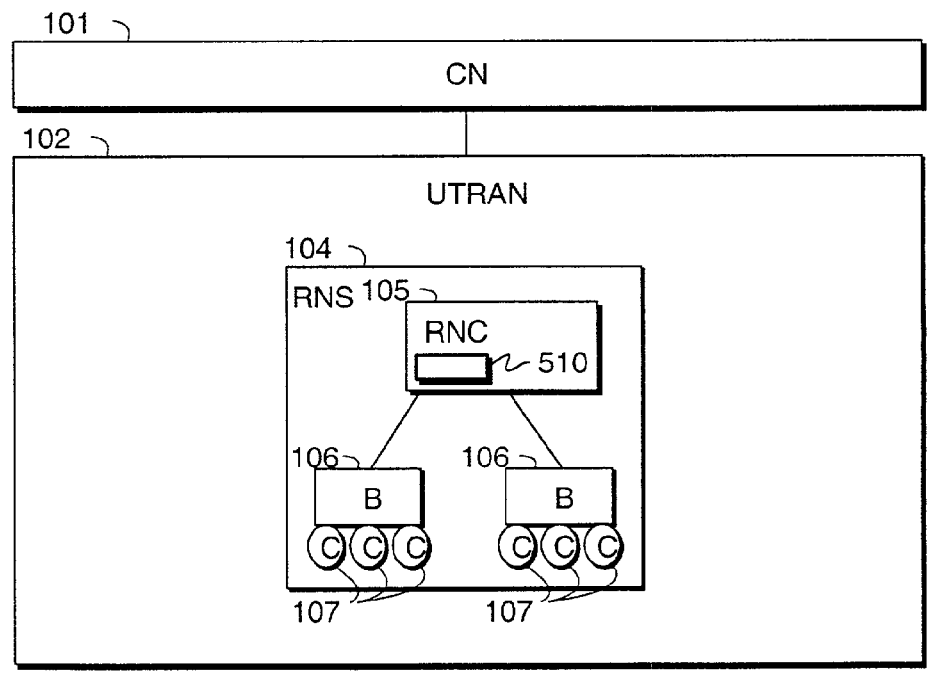
FIG. 6 illustrates a system according to an advantageous embodiment of the invention.

FIG. 6 illustrates a system according to an advantageous embodiment of the invention. FIG. 6 shows a core network 101, and a UTRAN (UMTS terrestrial radio access network) 102. The UTRAN comprises a radio network subsystem 104. The RNS comprises a RNC (radio network controller) 105 and one or more node Bs 106. Each node B gives rise to an least one coverage area, i.e. cell, which is designated in FIG. 6 by 107. According to an advantageous embodiment of the invention, the system comprises means 510 for adjusting the transmission level of at least the training sequence part of a burst carrying paging indicators to a certain level, said certain level having a predefined relation to the transmission level of the training sequence part of a burst belonging to a channel which is used in measurements of radio link quality. In this embodiment, the means 510 for adjusting the transmission level is located in the RNC. In other embodiments, the means 510 can be located in other network elements as well.

The invention has many advantages. For example, the invention allows better optimization of sleep mode operation for TDD terminals compared to the prior art. The invention also allows a reduction in the time required for reception of paging indicators and for measuring radio link quality. Further, the invention allows the determination of two different results from the reception of one burst in the sleep mode, namely determination whether there is a paging message coming to the terminal or not from the PICH bits of the burst, and to determine the cell Ec/N0 value for cell selection or reselection purposes from the received power level of the midamble of the same burst.

The invention can be applied in third generation cellular systems, such as the UMTS system.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. Method for transmitting paging indicators in a cellular telecommunication system employing time division duplex mode, in which method information is carried in bursts over the air interface, and in which method paging indicators are carried in data part of certain bursts having at least a data part and a training sequence part, wherein a transmission level of at least a training sequence part of a burst carrying paging indicators has a predefined relation to the transmission level of the training sequence part of a burst belonging to a channel which is used in measurements of radio link quality.

2. A method according to claim 1, wherein said channel is the primary common control physical channel.

3. A method according to claim 1, wherein said predefined relation is that the transmission level of at least the training sequence part of a burst carrying paging indicators is essentially the same as the transmission level of the training sequence part of a burst belonging to said channel.

4. A method in a mobile terminal of a cellular telecommunication network for measuring quality of a radio link between the mobile terminal and a base station of the network, which mobile terminal is arranged to employ time division duplex mode and to receive bursts carrying information from the base station, the bursts having at least a data part and a training sequence part, and which mobile terminal is arranged to receive paging indicators carried in certain bursts, wherein the method comprises steps, in which
    a burst carrying paging indicators is received,
    a reception level of the training sequence part of said burst is measured, and
    a result value indicating the quality of the radio link is determined on a basis of said measurement of the reception level of the training sequence part of said burst.

5. A mobile terminal of a cellular telecommunication network, which mobile terminal is arranged to employ time division duplex mode and to receive bursts carrying information from a base station, the bursts having at least a data part and a training sequence part, and which mobile terminal is arranged to receive paging indicators carried in certain bursts, wherein the mobile terminal comprises:
    means for receiving a paging indicator burst,
    means for measuring a reception level of the training sequence part of said paging indicator burst, and
    means for determining a result value indicating a quality of the radio link on a basis of the output of said means for measuring.

6. A system in a radio access network of a cellular telecommunication system employing time division duplex mode, in which mode information is carried in bursts over the air interface, and in which mode paging indicators are carried in data part of certain bursts having at least a data part and a training sequence part,
    wherein the system comprises means for adjusting a transmission level of at least the training sequence part of a burst carrying paging indicators to a certain level, said certain level having a predefined relation to the transmission level of the training sequence part of a burst belonging to a channel which is used in measurements of radio link quality.

7. A system according to claim 6, wherein said channel is the primary common control physical channel.

8. A system according to claim 6, wherein said predefined relation is that the transmission level of at least the training sequence part of a burst carrying paging indicators is essentially the same as the transmission level of the training sequence part of a burst belonging to said channel.

* * * * *